May 10, 1938. G. MARCHETTI 2,116,950
ELECTRICAL MEASURING INSTRUMENT
Filed June 10, 1937 3 Sheets-Sheet 2
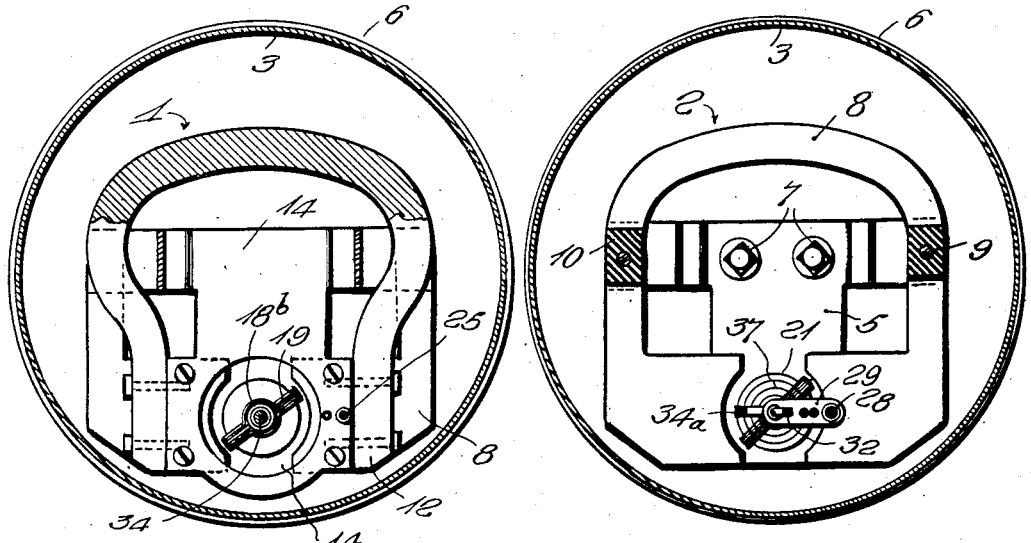
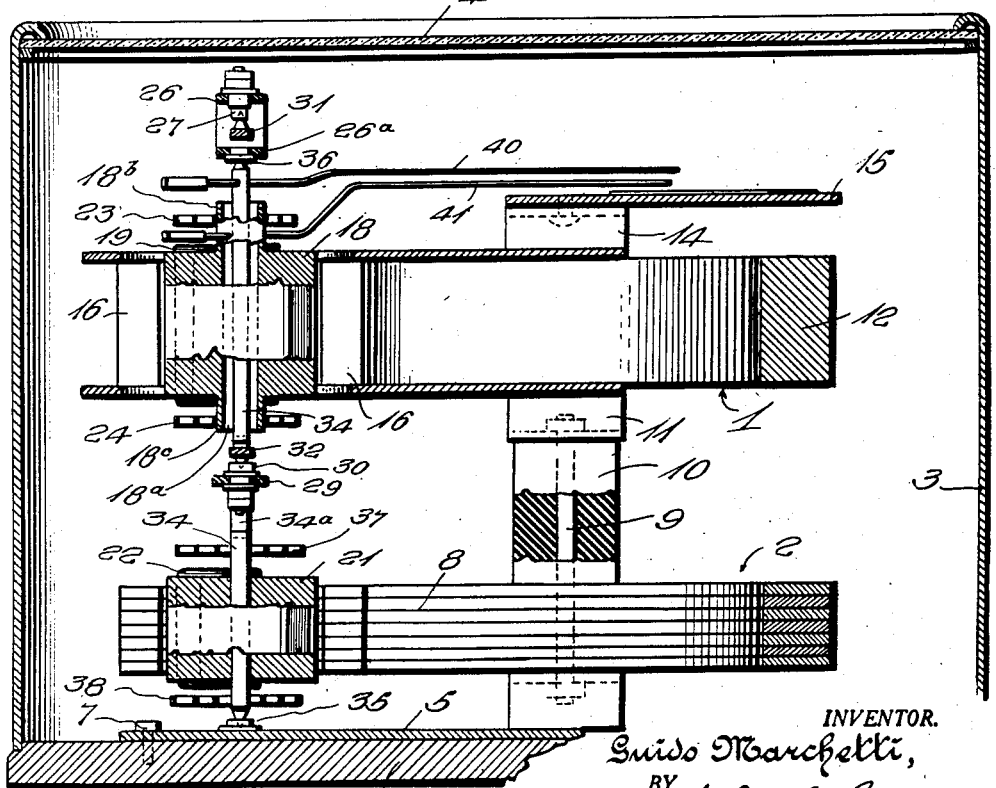
INVENTOR.
Guido Marchetti,
BY John B. Brady
ATTORNEY

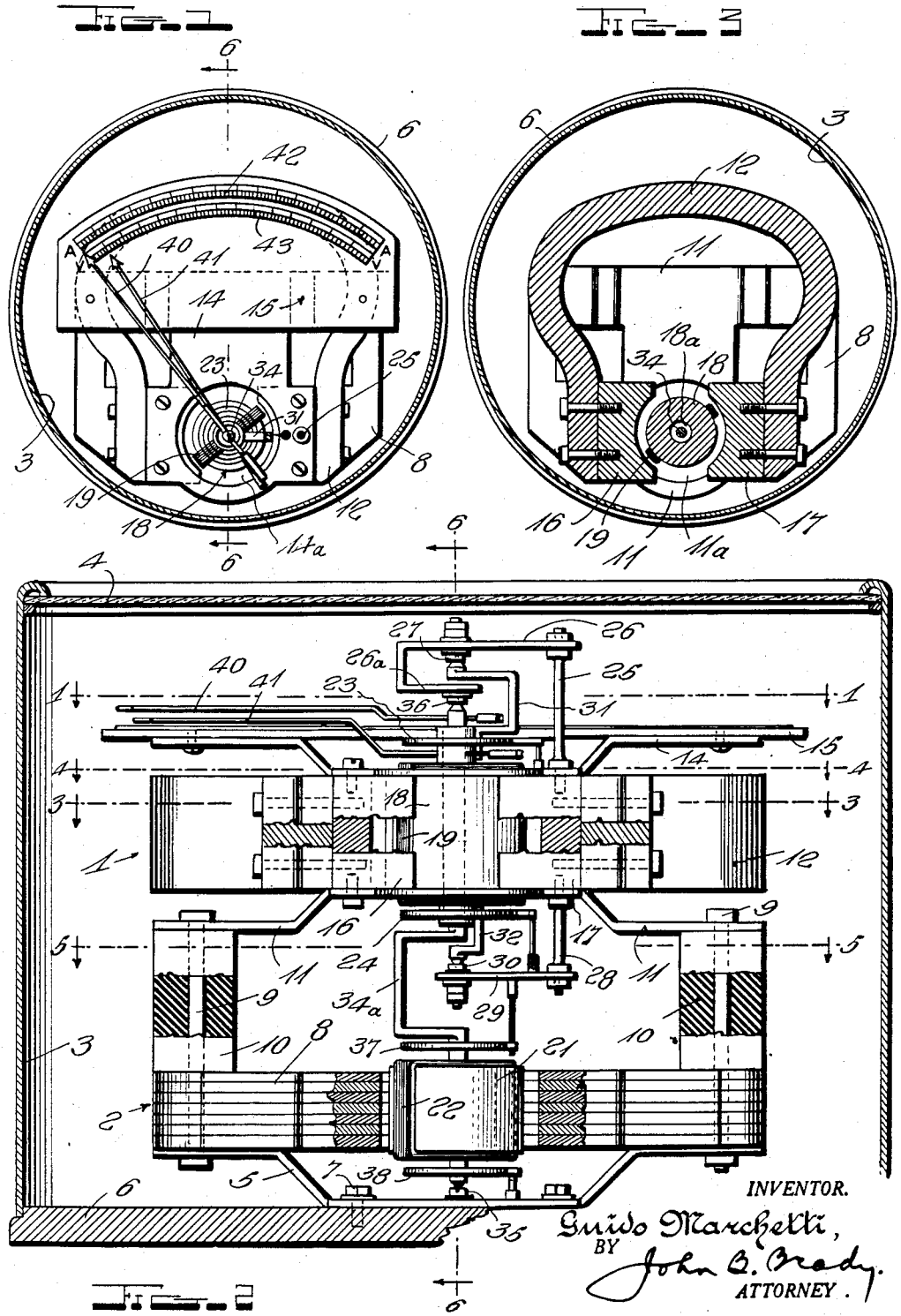

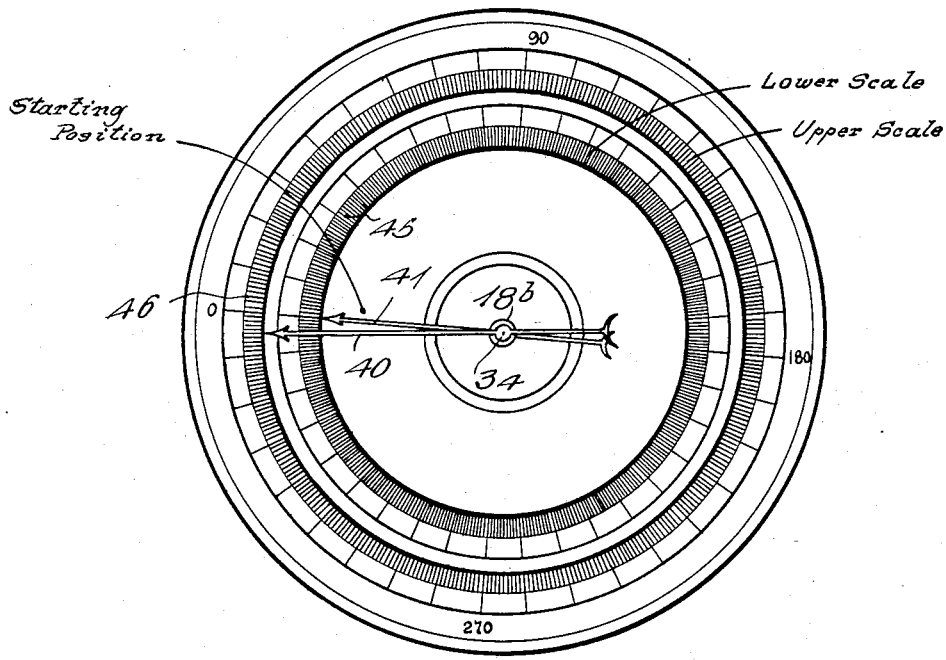

Patented May 10, 1938

2,116,950

UNITED STATES PATENT OFFICE 2,116,950

ELECTRICAL MEASURING INSTRUMENT

Guido Marchetti, Bakersfield, Calif.

Application June 10, 1937, Serial No. 147,560

5 Claims. (Cl. 171—95)

My invention relates broadly to electrical measuring instruments and more particularly to a multiple meter arrangement for indicating within a single field of vision the values of different electrical units in the same or different circuits for purposes of comparison or coordination.

In numerous uses of meters in electrical circuits, it is advantageous to have a ready comparison of the values of electrical units in various portions of the circuit in order that the operation of the circuits may be promptly determined and such adjustments or coordination effected as may be desired. The use of meters is widespread in electrical applications and in large installations extensive panel space is often required for the mounting of the different types of meters employed. Again, in small or compact devices such as portable testing apparatus the space required for mounting a number of meters often predetermines the dimensions of the device, while the same considerations of visual facility also obtain in smaller devices.

One of the objects of my invention, therefore, is to provide a compact multiple meter assembly having a single scale plate and indicators corresponding to the individual meters.

Another object of my invention is to provide particularly a duel meter arrangement having a single scale plate and dual indicators operative with respect thereto.

A further object of my invention is to provide a combination of voltmeter and ammeter in a single instrument having separate voltage and ampere scales and indicators separately operable with respect thereto, the meters being adapted for connection in the same electrical circuit to show voltage and current values therein.

Still another object of my invention is to provide a construction of multiple shaft assembly, each shaft being separately actuated, for use in precision metering apparatus.

A still further object of my invention is to provide a dual meter construction comprising separate meters arranged in superposed relation, with the indicator shafts extending concentrically with respect to the plane of an indicator plate and separate indicators being actuated by the shafts.

Other and further objects of my invention reside in the combination and structure hereinafter more fully described with reference to the accompanying drawings wherein:

Figure 1 is a horizontal sectional view of one form of apparatus of my invention, taken on line 1—1 in Fig. 2; Fig. 2 is an end elevation, with parts broken away and in section, of the dual meter construction of my invention; Fig. 3 is a horizontal sectional view thereof taken substantially on line 3—3 of Fig. 2; Figs. 4 and 5 likewise, are horizontal sectional views taken substantially on lines 4—4 and 5—5, respectively, in Fig. 2; Fig. 6 is a longitudinal vertical sectional view of the apparatus taken substantially on lines 6—6 in Figs. 1 and 2; and Fig. 7 shows a 360 degree scale which may be employed with the dual meter unit and the concentrically arranged indicators.

Referring to the drawings in more detail, reference will be made particularly to Figs. 2 and 6 which show most clearly the superposed relation of the meters and the shaft assemblies. In the form of my invention shown in the drawings, I provide a voltmeter assembly 1, and an ammeter assembly 2, mounted within a casing 3, having a transparent window 4. The ammeter assembly 2 is mounted on a bracket 5, secured to the base 6 by screw bolts 7 and to the magnetic field structure 8, forming part of the ammeter assembly 2, by bolts 9 which extend through insulator, spacer blocks 10 and apertures in a bracket 11. Magnetic field structure 12, forming part of the voltmeter assembly 1, is supported on the bracket 11 and in turn has mounted thereon a bracket 14 which supports a scale plate 15.

The magnetic field structure 12 as shown particularly in Figs. 3 and 4, comprises a permanent horseshoe magnet having pole pieces 16 and 17 secured thereto by bolts. Brackets 11 and 14 are bolted to the pole pieces 16 and 17, and have cut-out portions 11a and 14a permitting entrance of an armature structure. The opposed inner faces of the pole pieces 16 and 17 are arcuate shaped providing a uniform air gap between the pole pieces and a circular magnetic core member.

The magnetic field structure 8 is shown in laminated form comprising laminations having pole pieces formed integral therewith, as seen more clearly in Fig. 5. When the assembly 2 is that of an ammeter, as defined, the magnetic field structure 8 is constituted as a permanent magnet and need not be laminated, but where the assembly 2 is adapted for operation as an alternating current wattmeter, for example, by the addition of an energizing coil for the magnetic field structure 8, a laminated structure would be required. The apparatus as disclosed thus may be modified to particular requirements, and the example of the combination of voltmeter and ammeter is to be taken as illustrative only. The opposed inner faces of the pole pieces formed in the magnetic field structure 8 are arcuate shaped also to accommodate a circular magnetic core member.

Referring now to the armature structures and the mounting thereof, each meter assembly includes an armature structure comprising a magnetic core member and a coil. The voltmeter assembly 1 includes the armature core member 18 supporting coil 19, and the ammeter assembly 2 includes the armature core member 21 and coil 22. The core member 18 is centrally apertured as at 18a and provided with sleeve-like extensions 18b and 18c on which are mounted hairsprings 23 and 24 in opposite relation. A stud 25 is fixed in the upper face of pole piece 17 and supports a bracket member 26 upon which is mounted a jeweled bearing 27. Likewise, a stud 28 is mounted in the lower face of pole piece 17 to support a bracket member 29 upon which is mounted a jeweled bearing 30. Bearings 27 and 30 are aligned with the central axis of armature core member 18, and the sleeve-like extensions 18b and 18c thereof have arms 31 and 32 extending therefrom which have pointed extremities entering the jeweled bearings 27 and 30, respectively, for pivotally mounting the armature assembly 18, 19. The arms 31 and 32 are formed eccentrically with respect to the central axis of the core member 18, as will hereinafter be more fully described.

The core member 21 in the ammeter armature assembly is provided with an axially extending shaft 34 which engages at its lower extremity in a jeweled bearing 35 mounted on the lower bracket 5. The upwardly extending portion of the shaft 34 has a double bent portion 34a formed therein, to avoid contacting the bracket 29 and the coaxial bearing 30, and extends through the central aperture or bore 18a in the armature core member 18. Bracket 26 has a double bent portion 26a formed therein terminating below the bearing 27 and having a jeweled bearing 36 mounted thereon coaxially with bearing 35. The upper extremity of shaft 34 is pointed and enters the bearing 36 for pivotally mounting the armature assembly 21; 22.

It will now be seen that the arm 31 is double bent to avoid contacting the terminus of bracket 26 and coaxial bearing 36, and that arm 32 is offset to avoid contacting the shaft 34 above the double bent portion 34a thereof. All the bearings 27, 36, 30 and 35 are coaxially arranged for highest precision in the operation of the apparatus.

Hairsprings 23 and 24 connected with sleeve-like extensions 18b and 18c have already been noted. Similarly, hairsprings 37 and 38 are fixed to shaft 34, in opposite relation, above and below the core member 21, as shown. The outer extremities of the hairsprings are secured to suitable pin members fixed on adjacent frame structure as is clearly shown in Fig. 2. The hairsprings are adapted to maintain the armature assemblies in pivotally balanced positions with the coils in operative relation to the core structure. Connections are made to the coils in any well known manner, by flexible conductors, or, with the use of suitable insulation, through the hairsprings associated with the respective armature assemblies.

An indicator arm 40 is fixed to the shaft 34 near the upper extremity thereof, above the end of sleeve-like extension 18b, and a separate indicator arm 41 is fixed to the sleeve-like extension 18b. The indicator arms are but slightly displaced vertically so that their movement may be said to be substantially coplanar with respect to the scale plate. As shown in Fig. 1, the indicator arms are deflected with respect to separate scales 42, 43, mounted on the scale plate 15. Indicator arm 41 is shown slightly displaced, from zero scale reading, for clearness. It will be understood that where the unit measured by both meters is the same, but a single scale is required. Differentiation in the readings may be effected in any suitable manner, as by separate scales and indicators of different lengths, as shown.

When intended for measurement of voltage and current in the same circuit, the coils 19 and 22 may be so connected within the casing 3 that but three conductors need be connected to the circuit. Ordinarily, however, separate connections are provided to each of the coils so that each meter may be connected as desired.

In Fig. 7, I have shown the manner of arranging a 360 degree scale over which both indicator arms 40 and 41 may operate. The 360 degree scale is indicated at 45 over which indicator arm 41, fixed to sleeve-like extension 18b operates. Indicator arm 40, fixed to shaft 34 operates over 360 degree scale 46. The concentrically arranged indicator arms 40 and 41 are free to pass each other for providing readings on the 360 degree scales.

Thus, while I have illustrated a preferred embodiment of my invention, I desire it to be understood that modifications may be made, and that no limitations upon my invention are intended other than may be imposed by the scope of the appended claims.

What I claim as new and desire to secure by Letters Patent of the United States is as follows:

1. Electrical measuring apparatus comprising in combination, separate meter devices mounted in superposed relation, a scale plate mounted above said devices, an indicator arm individual to each of said devices, and means including separate sets of axial bearing supports for mounting said indicator arms with respect to said meter devices for coaxial and substantially coplanar movement thereof with respect to said scale plate.

2. Electrical measuring apparatus comprising in combination, two separate meter devices mounted in superposed relation, each device including a magnetic field structure and an armature assembly, a scale plate mounted above said devices, means for separately and coaxially mounting said armature assemblies with the lower of said armature assemblies having a coaxial extension thereon terminating above the upper of said armature assemblies, and indicator arms individual to said armature assemblies and both operative with respect to said scale plate, the indicator arm for the lower of said armature assemblies being mounted on said extension.

3. Electrical measuring apparatus comprising in combination, two separate meter devices mounted in superposed relation, each device including a magnetic field structure and an armature assembly, a scale plate mounted above said devices, said armature assemblies being disposed in coaxial relation and the upper of said armature assemblies having an axial bore therein, means for separately mounting said armature assemblies including an extended shaft member connected with the lower of said armature assemblies and extending axially through the bore in the upper of said armature assemblies, and indicator arms individual to said armature assemblies and both operative with respect to said scale plate, the indicator arm for the lower of said armature assemblies being mounted on said extended shaft member.

4. Electrical apparatus comprising a frame structure including two superposed magnetic field members, armature assemblies individual to said field members, and means for mounting said armature assemblies in superposed coaxial relation comprising a support having a double bent portion providing dual bearing means in separate horizontal planes mounted on said frame structure above said armature assemblies, separate supports providing individual bearing means mounted on said frame structure intermediate said armature assemblies and below said armature assemblies, all said bearing means being disposed in vertical alignment, the upper of said armature assemblies having an axial bore therein, an eccentric arm member fixed to said upper armature assembly and engaging the bearing means supported intermediate said armature assemblies, a double bent arm member fixed to said upper armature assembly and engaging the upper of said bearing means supported above said armature assemblies, a stud shaft in the lower of said armature assemblies engaging the bearing means supported below said armature assemblies, and an extended shaft member fixed to said lower armature assembly and having a double bent portion disposed around the bearing means intermediate said armature assemblies and a coaxial portion extending through the bore in said upper armature assembly and engaging the lower of said bearing means supported above said upper armature assembly, said armature assemblies being adapted for limited angular movement in said bearing means.

5. Electrical apparatus comprising a frame structure including two superposed magnetic field members, armature assemblies individual to said field members, and means for mounting said armature assemblies in superposed coaxial relation comprising sets of bearing members arranged in vertical alignment with the members in one set disposed in alternation with the members of the other set, and means connected with the upper of said armature assemblies and engaging the upper alternate bearing members, and means connected with the lower of said armature assemblies and engaging the lower alternate bearing members.

GUIDO MARCHETTI.